United States Patent
Paulsen et al.

(10) Patent No.: US 12,293,202 B1
(45) Date of Patent: May 6, 2025

(54) CREATING NEW WORKLOADS FOR LAUNCH WIZARDS

(71) Applicant: Amazon Technologies, Inc., Seattle, WA (US)

(72) Inventors: Joseph Paulsen, Bainbridge Isand, WA (US); Apoorva Dhelia, Kirkland, WA (US); Nathan Eldon Nesbit, Duvall, WA (US); Mohamed Gaber Ab Abdallah, Everett, WA (US); Vidit Bhargava, Seattle, WA (US); Savita Ganeshomal Manghnani, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 113 days.

(21) Appl. No.: 18/082,750

(22) Filed: Dec. 16, 2022

(51) Int. Cl.
  *G06F 9/451* (2018.01)
  *G06F 3/04847* (2022.01)
  *G06F 40/174* (2020.01)
  *H04L 9/40* (2022.01)

(52) U.S. Cl.
  CPC .......... *G06F 9/453* (2018.02); *G06F 3/04847* (2013.01); *G06F 40/174* (2020.01); *H04L 63/102* (2013.01)

(58) Field of Classification Search
  CPC .... G06F 9/453; G06F 3/04847; G06F 40/174; H04L 63/102
  See application file for complete search history.

(56) References Cited

U.S. PATENT DOCUMENTS

| | | | | |
|---|---|---|---|---|
| 11,032,213 B1* | 6/2021 | Hussain | ................... | H04L 41/40 |
| 2014/0068053 A1* | 3/2014 | Ravi | ....................... | G06F 9/5072 |
| | | | | 709/224 |
| 2015/0347352 A1* | 12/2015 | Narayanan | ............. | G06Q 10/10 |
| | | | | 715/222 |
| 2016/0191411 A1* | 6/2016 | Kim | ......................... | H04L 67/04 |
| | | | | 726/3 |

\* cited by examiner

*Primary Examiner* — Rami R Okasha
(74) *Attorney, Agent, or Firm* — Lee & Hayes, P.C.

(57) ABSTRACT

Techniques implemented by a launch wizard of a cloud computing system to enable developers to create new workloads that can be launched by the launch wizard in the cloud computing system. Launch wizards offer users with guided experiences for identifying and deploying resources needed to support workloads of applications running in cloud computing systems. However, it is difficult for developers to create new workloads for the launch wizard to support. This disclosure describes a development platform through which developers create new workloads for the launch wizard to launch on behalf of users. The development platform provides a console through which developers define new workloads using a metadata language, and dynamically generates and presents a provisioning form that describes the new workloads. Once developers have finished defining new workloads, the new workloads are registered with the launch wizard such that users can use the launch wizard to launch the new workloads.

20 Claims, 13 Drawing Sheets

CREATING NEW WORKLOADS FOR LAUNCH WIZARDS

BACKGROUND

Cloud computing providers offer cloud-based services to fulfill users' computing-service needs without the users having to invest in and maintain computing infrastructure required to implement their services. These cloud providers maintain networks of managed computing resources and functionality to implement various types of scalable, on-demand services, to support workloads of the users. Specifically, the cloud providers maintain networks of data centers, which in turn may include a number of interconnected computing devices (or "servers"), that provide computing resources to support applications or services of the users. The cloud providers offer various types of predefined workloads that can be launched on the computing resources, where a workload is a collection of resources and code that delivers some functionality, such as a user-facing application or a backend process. While these predefined workloads offered by the cloud providers are useful, users often desire to run third-party applications in the cloud which are not natively supported by the cloud providers. However, it can be difficult for users to manually identify, size, configure, and deploy computing resources to support their third-party applications in cloud computing systems.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
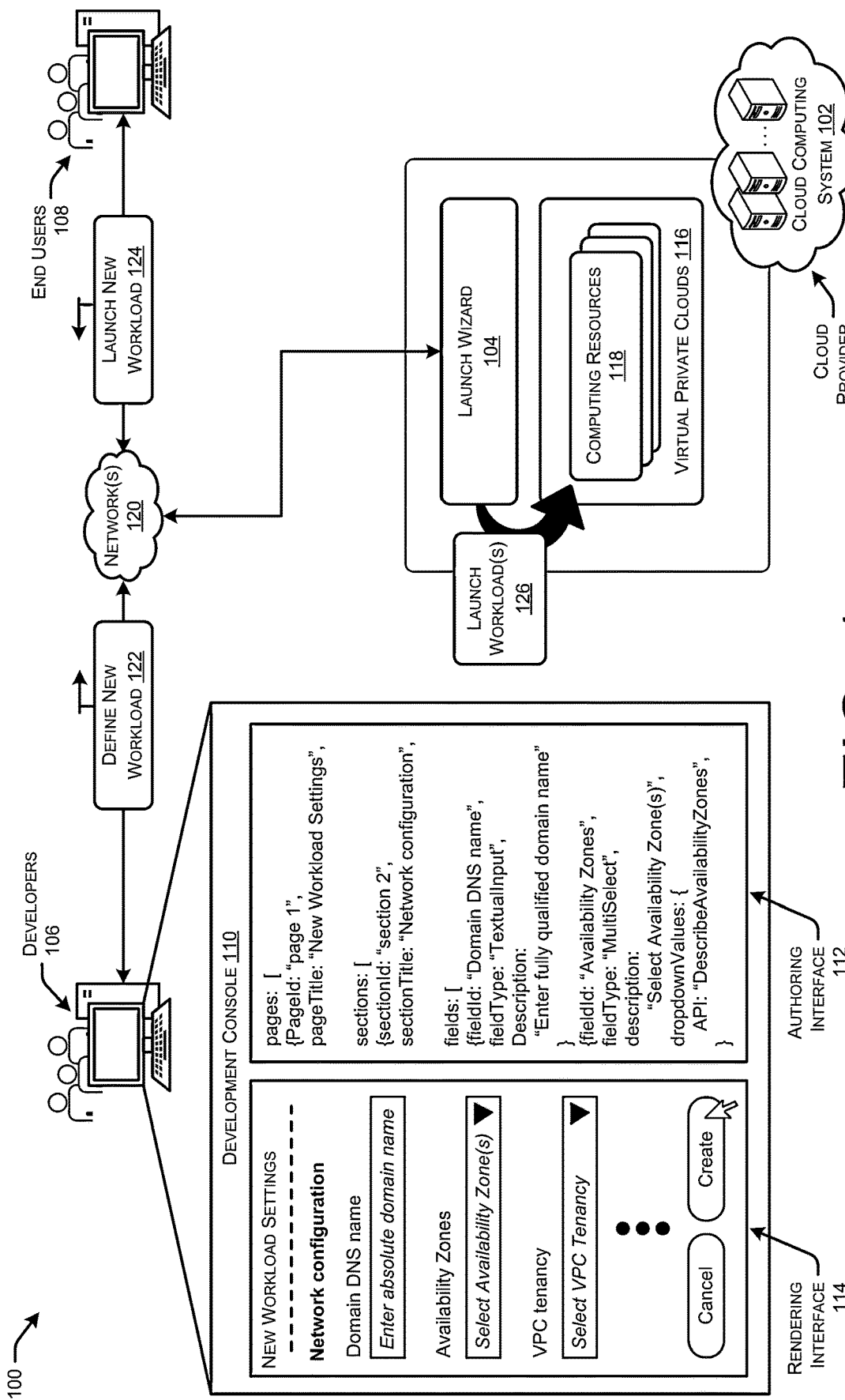
FIG. 1 illustrates a system-architecture diagram of an example environment in which a launch wizard of a cloud computing system enables developers to create new workload types that can be launched using the launch wizard.

This disclosure describes techniques implemented by a launch wizard of a cloud computing system to enable developers to efficiently create new workload types that can be launched by the launch wizard in the cloud computing system. Launch wizards provide users with guided experiences for identifying and deploying resources needed to support workloads of workloads running in cloud computing systems. For instance, launch wizards offer guided ways for users to size, configure, and deploy computing resources for workloads that support third-party workloads without the need for the users to manually identify and provision the underlying computing resources for new workloads. However, it is time consuming, inefficient, and generally requires a high level of expertise for developers to create new workload types for which the launch wizard is able to provide a guided launch experience. This disclosure describes a development platform through which developers are able to efficiently create new workload types for the launch wizard to support and launch on behalf of users. The development platform provides a dynamic console for developers to define new workloads using a common metadata language, and dynamically generates and presents a provisioning form that describes the new workload type. Once a developer has finished defining their workloads, and the resulting provisioning form, the new workload type is registered with the launch wizard such that end users can use the provisioning form in a guided experience to launch the new workload type in the cloud computing system.

As described herein, a provisioning form is a template, interface, or other data structure that can be used to create a workload. The provisioning form may have one or more fields, or interface areas, through which developer may input workload parameters for the workload that the form is usable to create. In some instances, a workload may be created using a single form, or multiple provisioning forms in a sequence. Thus, a workload can be defined by forms or provisioning templates which are used by a provisioning service to launch the workload.

Users of cloud computing systems can use launch wizards as a guided way to size, configure, and deploy cloud computing resources for various workloads. The launch wizard takes on much of the identifying and provisioning tasks when it comes to the infrastructure on which the workloads run. However, as noted above, there are various challenges when creating new workloads for the launch wizard to launch on behalf of users. Further, third-party developers are not even able to create and register new workloads with launch wizard, which reduces the usefulness of the service.

In light of this, developers are able to use the development platform described herein to create provisioning forms that are used to provision new workloads, and register the forms for the new workloads with the launch wizard. Third-party developers, experts internal to the cloud provider, and other types of developers, may access one or more user interfaces that are used to create the new workload types via a one or more consoles of the launch wizard. For instance, a development console may be provided by the launch wizard that may run on a client of a client device of the developer, such as a browser or application. In the development console, the developer has access to a user interface that includes an authoring interface that receives, in a metadata language, a definition of a provisioning form usable to create a workload for the cloud computing system. Further, the user interface may include a rendering interface that dynamically presents visualizations of the provisioning form as the developer creates the provisioning form for the new workload.

While any language may be used to create the new workload, the metadata language may be used to provide a common format that is easy to understand for developers, and easily digestible and understood by the launch wizard. Generally, the metadata language is used to define forms for new workloads according to a schema that includes pages, sections, and fields. A page is considered a step in creating a new workload, such as defining workload settings, infrastructure settings, connectivity settings, and so forth. Each page includes one or more sections, which are the areas in form that collect the actual information needed to provision the new workload. For instance, sections can be used to define network configurations for the workload, performance characteristics of the workload, and so forth. Each section includes one or more fields, which are the data building blocks through which end users provide information. Fields can come in various forms, such as simple text or numeric input fields, drop down fields, multiple-selection fields, and so forth. The developer may use the metadata language to define the provisioning form that includes pages, sections, and fields to prompt end users to provide workload provisioning information, also referred to herein as provisioning parameters, needed by the launch wizard to provision the new workload type.

In addition to defining fields to receive user input defining various provisioning parameters for the workload, the developer may further define various types of rules for the fields. For instance, the developer may create maximums and minimums for numeric fields, such as minimum and maximum amounts of remote desktop gateway hosts to create for the workload. Further, the developer may create error messages to help end users that are inputting incorrect values or information into various fields. Additionally, some fields, such as the dropdown fields and multi-select fields, may have their dropdown menus populated with information retrieved from the end users' accounts. As an example, a field in which users are prompted to list availability zones for a workload, the field may have an instruction to call an application programming interface (API) that collects a list of availability zones registered for that user's account. The dropdown menus for that field may then be populated with a list of the user's availability zones from which the user may select.

As the developer continues to create the provisioning form for the new workload using the metadata language in the authoring interface, the rendering interface may dynamically present a current, or nearly current, state of the provisioning form as defined by the developer. For instance, the rendering interface may refresh (e.g., periodically, continuously, in response to a request, etc.) and show updated visualizations of the provisioning form as it currently stands, and as it will be seen by end users. To do so, the development console of the launch wizard may compile the metadata language into the provisioning form, and present dynamic visualizations of the provisioning form. In this way, the developer may adjust their code to ensure the resulting provisioning form is in a desired format to be used for creating the workload.

Once the developer has finished creating the provisioning form for the new workload, the developer selects an option that instructs the launch wizard to create and deploy the new workload. The metadata language defining the provisioning form may be provided to an onboarding service of the launch wizard that initially validates that the metadata language defining the provisioning form conforms to a schema used by the launch wizard to provision workloads. Further, the onboarding service may register the new workload with the launch wizard and store the provisioning form for use by end users to launch the new workload in their respective compute environments (e.g., virtual private clouds (VPCs), virtual private networks, etc.).

End users may use a service console provided by the launch wizard to launch the new workload using the provision form. The service console may expose the provisioning form to the end users via the client running on the respective user devices. The end users may then be guided by the provisioning form to input the provisioning parameters needed by the launch wizard to launch the new workload. Once the user has finished populating the fields with the appropriate provisioning parameters, the user may request that the new workload be launched in their VPC(s). A provisioning service may extract the provisioning parameters from the provisioning form and map them to provisioning templates that, when populated, are usable by the provisioning service to provision the workload. Using the provisioning templates, the provisioning service may provision the workload in VPC(s) of the user based on the provisioning parameters dictated by the user.

The development platform provided by the launch wizard described herein enables developers to create new workloads, such as enterprise or third-party workloads, for the launch wizard. This improves the usefulness of launch wizards, and improves upon prior techniques, by increasing the number of workloads that can run in a cloud computing system. Thus, the techniques described herein solve a technical problem rooted in technology (e.g., improving the ability of cloud provider systems to launch varieties of workloads on cloud computing resources) using a solution rooted in technology.

The techniques described herein are with reference to a cloud provider network or system and a launch wizard. However, the techniques are equally applicable to any network or environment, and for any computing service. For example, the techniques are equally applicable for other service provider networks, on-premises networks, and so forth. Further, the techniques are equally applicable for different services beyond a launch wizard. Additionally, while the techniques are described with respect to creating provisioning forms for new workloads, the metadata language and techniques described herein may be applied for other use cases. For instance, the metadata language may be used to create any type of new console experiences or configuration interfaces beyond new workloads for a cloud system. For instance, the metadata language and the dynamic rendering of user interfaces may be applied for any type of user interface creation, and may not necessarily be limited to cloud technology areas.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a cloud computing system 102 provides a launch wizard 104 that enables developers 106 to create new workload types that can be launched using the launch wizard 104.

The cloud computing system 102 may be operated and/or managed by a cloud provider and may provide various services to users to fulfil their computing resource needs, such as cloud-based computing resources. Users 108 may operate user devices in order to register for use of the computing resources of the cloud computing system 102. The cloud computing system 102 may include a launch wizard 104 that includes components for providing the users 108 with a guided experience for launching workloads. Generally, the launch wizard 104 may be, at least partly, a control-plane system that controls operations occurring in the cloud computing system 102. The launch wizard 104 may be either centralized, or distributed, and be supported by one or more computing devices.

As illustrated, a cloud computing system 102 may be operated and/or managed by a cloud provider. The cloud computing system 102 may provide various services to users 108 to fulfil their computing resource needs, such as cloud-based computing resources. For example, the cloud computing system 102 may provide cloud-based, scalable, and network accessible compute power services, storage services, database services, and/or other services. Users 108 may utilize user devices to subscribe for use of the computing resources and/or services provided by the cloud computing system 102.

Generally, the cloud computing system 102 (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to user commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud computing system 102 can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud computing system 102 (or "cloud provider network"). Preferably, availability zones within a region are positioned far enough away from one other that the same natural disaster should not take more than one availability zone offline at the same time. Users 108 can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud computing system 102 may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

With cloud computing, instead of buying, owning, and maintaining their own data centers and servers, organizations can acquire technology such as compute power, storage, databases, and other services on an as-needed basis. The cloud computing system 102 may provide on-demand, scalable computing services to users 108 through a network, for example allowing users 108 to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users 108 to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user 108, the hardware associated with the virtual computing devices can be scaled up or down depending upon the resources the user 108 requires. Users 108 can choose to deploy their virtual computing systems to provide network-based services for their own use and/or for use by their users or client.

The cloud computing system 102 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users 108 of the cloud computing system 102, which may be provisioned in user accounts.

The cloud computing system 102 may offer many different built-in services to the users 108 to help run their workloads and services. For instance, the cloud computing system 102 may provide users 108 with use of virtual private clouds (VPCs), which are logically isolated sections of the cloud computing system 102 that serve as private virtual environments to which only permitted users 108 have access to use. Users 108 may have multiple VPCs, potentially spanning across different regions of the cloud computing system 102. To help interconnect VPCs and other resources of the user's computing infrastructure, the service provider may also offer many different built-in networking services. The VPCs may be used by the users 108 to create subnetworks, configure personalized route tables, choose IP addresses, monitor connections, screen network traffic, restrict access into the VPCs 116, and/or for other operations. The VPCs include or run computing resources, such as servers, virtual machines (VMs), containers, serverless functions, workloads, processes, etc. Generally, the computing resources are used to support or run workloads or services of the users 108.

The cloud provider offers various types of predefined workloads that can be launched on the computing resources, where a workload is a collection of resources and code that delivers some functionality, such as a user-facing application or a backend process. In some instances, an application comprises multiple workloads that work together and provide the overall functionality of the application. In other examples, the terms workload and application may be used interchangeably.

As shown, the developers 106 are able to use a development platform described herein to create provisioning forms that are used to provision new workloads, and register the forms for the new workloads with the launch wizard 104. The developers 106 may be third-party developers or customers, experts internal to the cloud provider, and other types of developers, and may access one or more user interfaces that are used to create the new workload types via a one or more consoles of the launch wizard. For instance, a development console 110 may be provided by the launch wizard 104 that may run on a client of a client device of the developer 106, such as a browser or application. In the development console 110, the developer 106 has access to one or more user interfaces that include an authoring interface 112 that receives, in a metadata language, a definition of a provisioning form usable to create a workload for the launch wizard 104. Further, the user interface(s) may include a rendering interface 114 that dynamically presents visualizations of the provisioning form as the developer 106 creates the provisioning form for the new workload.

While any language may be used to create the new workload, the metadata language may be used to provide a common format that is easy to understand for developers 106, and easily digestible and understood by the launch wizard 104. In an illustrative example, the metadata language is used to define forms for new workloads according to a schema that includes pages, sections, and fields. A page is considered a step in creating a new workload, such as defining workload settings, infrastructure settings, connectivity settings, and so forth. As illustrated, the page in this example indicates that the information input for that page is relevant to "New Workload Settings" for the workload/application being created by the developer 106.

Each page includes one or more sections, which are the areas in form that collect the actual information needed to provision the new workload. For instance, sections can be used to define network configurations for the workload, performance characteristics of the workload, and so forth. In this example, the section illustrates is meant to receive information regarding "Network configuration" information for the new workload. Each section includes one or more fields, which are the data building blocks through which end users 108 provide information. Fields can come in various forms, such as simple text or numeric input fields, drop down fields, multiple-selection fields, and so forth. In the illustrative example, the developer 106 has used a textual input field to receive a DNS name, and a multi-select field to receive one or more availability zones for the new workload. The developer 106 may use the metadata language to define the provisioning form that includes pages, sections, and fields to prompt end users 108 to provide workload provisioning information, also referred to herein as provisioning parameters, needed by the launch wizard 104 to provision the new workload type.

In addition to defining fields to receive user input defining various provisioning parameters for the workload, the developer 106 may further define various types of rules for the fields. For instance, the developer 106 may create maximums and minimums for numeric fields, such as minimum and maximum amounts of remote desktop gateway hosts to create for the workload. Further, the developer 106 may create error messages to help end users 108 that are inputting incorrect values or information into various fields. Additionally, some fields, such as the dropdown fields and multi-select fields, may have their dropdown menus populated with information retrieved from the end users' 108 accounts. As shown in the illustrative example, a field in which users 108 are prompted to list availability zones for a workload, the field may have an instruction to call an API that collects a list of availability zones registered for that user's 108 account. The dropdown menus for that field may then be populated with a list of the user's availability zones from which the user 108 may select.

As the developer 106 continues to create the provisioning form for the new workload 122 using the metadata language in the authoring interface 112, the rendering interface 114 may dynamically present a current, or nearly current, state of the provisioning form as defined by the developer 106. For instance, the rendering interface 114 may refresh (e.g., periodically, continuously, in response to a request, etc.) and show updated visualizations of the provisioning form as it currently stands, and as it will be seen by end users 108. To do so, the development console 110 of the launch wizard 104 may compile the metadata language into the provisioning form, and present dynamic visualizations of the provisioning form. In this way, the developer 106 may adjust their code to ensure the resulting provisioning form is in a desired format to be used for creating the workload.

Once the developer 106 has finished creating the provisioning form for the new workload, the developer selects an option that instructs the launch wizard 104 to create and define a new workload or workload 122. The metadata language defining the provisioning form may be provided to an onboarding service of the launch wizard 104 that initially validates that the metadata language defining the provisioning form conforms to a schema used by the launch wizard 104 to provision workloads. Further, the onboarding service may register the new workload with the launch wizard 104 and store the provisioning form for use by end users 108 to launch the new workload 124 in their respective compute environments (e.g., virtual private clouds (VPCs), virtual private networks, etc.).

End users 108 may use a service console provided by the launch wizard 104 to launch the new workload using the provision form. The service console may expose the provisioning form to the end users 108 via the client running on the respective user devices. The end users 108 may then be guided by the provisioning form to input the provisioning parameters needed by the launch wizard 104 to launch the new workload. Once a user 108 has finished populating the fields with the appropriate provisioning parameters, the user 108 may request that the new workload be launched in their VPC(s). A provisioning service may extract the provisioning parameters from the provisioning form and map them to provisioning templates that, when populated, are usable by the provisioning service to provision the workload. Using the provisioning templates, the provisioning service of the launch wizard 104 may launch the workload(s) 126 onto computing resources 118 in VPC(s) 116 of the user 108 based on the provisioning parameters dictated by the user 108.

In the example a cloud computing system 102, the users 108 may have created user accounts with the cloud provider to utilize the resources of the cloud computing system 102. The users 108 may utilize their devices 108 to communicate over one or more networks 120 (e.g., WANs, PANs, LANs, etc.) with the cloud computing system 102. The user devices may comprise any type of computing device configured to communicate over network(s) 120, such as mobile phones, tablets, laptop computers, desktop computers, televisions, servers, and/or any other type of computing device. The users 108 (e.g., network administrators, organization employees, etc.) may interact with the cloud computing system 102, via their user account and/or one or more user portals (e.g., web console, command line interface (CLI), application programming interface (API), etc.).

Generally, the launch wizard 104, and components thereof, may comprise software, firmware, and/or other logic that is supported one computing device, or across more computing devices in the cloud computing system 102. Additionally, the launch wizard 104 may comprise a system of other devices. The techniques described herein are generally described with respect to a cloud provider network, such as a cloud provider network or system. However, the techniques are generally applicable for any network, such as on-premises networks, hybrid networks, and so forth.

The cloud computing system 102 may include one or more hardware processors (processors), one or more devices, configured to execute one or more stored instructions. The processor(s) may comprise one or more cores. Further, the cloud computing system 102 may include one or more network interfaces configured to provide communications between the cloud computing system 102 and other devices, such as the user device(s), and/or other systems or devices in the cloud computing system 102 and/or remote from the cloud computing system 102. The network interfaces may include devices configured to couple to personal area networks (PANs), wired and wireless local area networks (LANs), wired and wireless wide area networks (WANs), and so forth.

The cloud computing system 102 may also include computer-readable media that stores various executable components (e.g., software-based components, firmware-based components, etc.). In addition to various components discussed in FIG. 1, the computer-readable-media may further store components to implement functionality described herein. While not illustrated, the computer-readable media may store one or more operating systems utilized to control the operation of the one or more devices that comprise the cloud computing system 102. According to one embodiment, the operating system comprises the LINUX operating system. According to another embodiment, the operating system(s) comprise the WINDOWS SERVER operating system from MICROSOFT Corporation of Redmond, Washington. According to further embodiments, the operating system(s) can comprise the UNIX operating system or one of its variants. It should be appreciated that other operating systems can also be utilized.

Additionally, the cloud computing system 102 may include a data store, or storage, which may comprise one, or multiple, repositories or other storage locations for persistently storing and managing collections of data such as databases, simple files, binary, and/or any other data. The storage may include one or more storage locations that may be managed by one or more database management systems.

To utilize the services provided by the cloud computing system 102, the users 108 may register for an account with the cloud computing system 102. For instance, users 108 may utilize a user device to interact with an identity and access management (IAM) service that allows the users 108 to create user accounts with the cloud computing system 102. Generally, the IAM service may enable the users 108 to manage their network infrastructures remotely, and interact with at least the launch wizard 104. Generally, the different user accounts can assume different roles, or sets or permissions/credentials, that allow network users 108 to perform different actions, and be restricted from performing some actions.

The computer-readable media may be used to store and retrieve information, such as program modules, data structures, or other data. It should be appreciated by those skilled in the art that computer-readable storage media is any available media that provides for the non-transitory storage of data and that can be accessed by the cloud computing system 102. In some examples, the operations performed by the cloud computing system 102, and or any components included therein, may be supported by one or more server devices. Stated otherwise, some or all of the operations performed by the cloud computing system 102, and or any components included therein, may be performed by one or more computer devices operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

Figure 2:
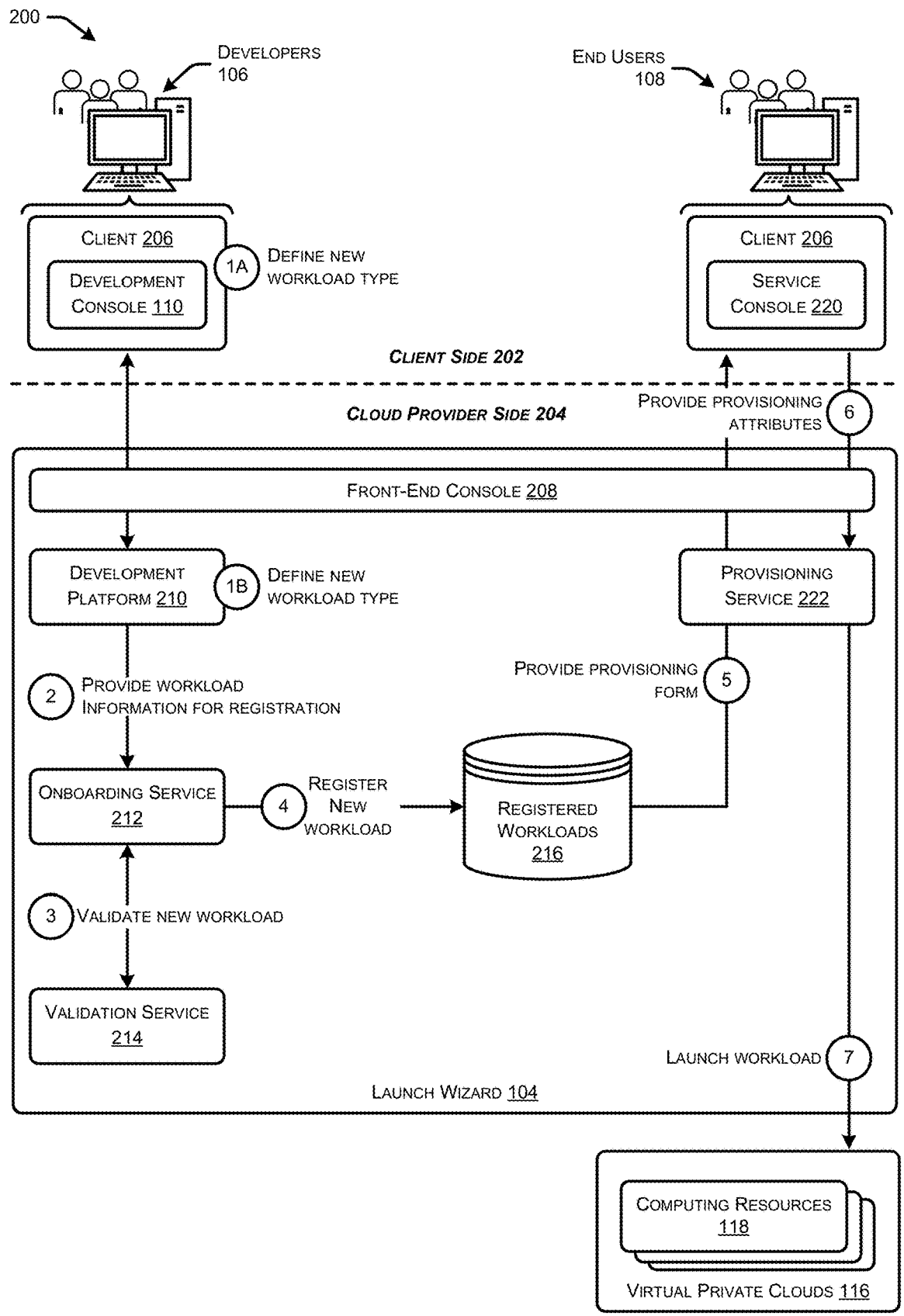
FIG. 2 illustrates a component diagram of an example environment in which the launch wizard receives a new workload type from a developer, registers the new workload type, and launches the new workload type on behalf of end users.

FIG. 2 illustrates a component diagram 200 of an example environment in which the launch wizard 104 receives a new workload type from a developer 106, registers the new workload type, and launches the new workload type on behalf of end users 108.

At 1A, the developer 106 may define a new workload type working in conjunction with a development platform 210 at 1B. For instance, the development platform 210 may provide a development console 110 to the developer that may run on a client 206 of a device of the developer 106, such as a browser client 206 or application client 206. In the development console 110, the developer 106 has access to one or more user interfaces that include an authoring interface 112 that receives, in a metadata language, a definition of a provisioning form usable to create a workload for the launch wizard 104. Further, the user interface(s) may include a rendering interface 114 that dynamically presents visualizations of the provisioning form as the developer 106 creates the provisioning form for the new workload.

At 2, the development platform 210 may receive the new workload type and provide workload information to an onboarding service 212 for registration. For instance, the metadata language defining the provisioning form may be provided to the onboarding service 212 that initially validates, at 3, that the metadata language defining the provisioning form conforms to a schema used by the launch wizard 104 to provision workloads. For instance, a validation service 214 may determine that the metadata is of a certain type of file that represents the launch wizard 104 (e.g., JavaScript Object Notation (JSON) file, YAML file, etc.). Further, the validation service 214 may use a validation library to perform file schema validation to validate that the metadata file fits the model of the launch wizard 104, and dependency validation where the validation service 214 asserts that the dependency between user interface components of the provisioning form are correct in instances where the provisioning form dynamically renders user interface components that based on a value for another component.

At 4, the onboarding service 212 may register the new workload in a catalogue, database, or other repository for registered workloads 216 of the launch service 104. The registered workload may be used as a provisioning template that, when populated, is usable by a provisioning service 222 to provision the workload.

At 5, the end user 108 may be provided with the provisioning form for the new workload via a service console 220 executing on the client 206 on a device of the end user 108. The end user 108 may use the service console 220 to launch the new workload using the provision form. The service console 220 may expose the provisioning form to the end users 108 via the client 206 running on the device. The end user 108 may then be guided by the provisioning form to input the provisioning parameters, at 6, needed by the launch wizard 104 to launch the new workload. Once a user 108 has finished populating the fields with the appropriate provisioning parameters, the user 108 may request that the new workload be launched in their VPC(s). The provisioning service 222 may extract the provisioning parameters from the provisioning form and use the provisioning parameters to provision the workload. Using the provisioning parameters received via the provisioning form, the provisioning service 222 may, at 7, launch the workload(s) 126 onto computing resources 118 in VPC(s) 116 of the user 108 based on the provisioning parameters dictated by the user 108.

Figure 3:
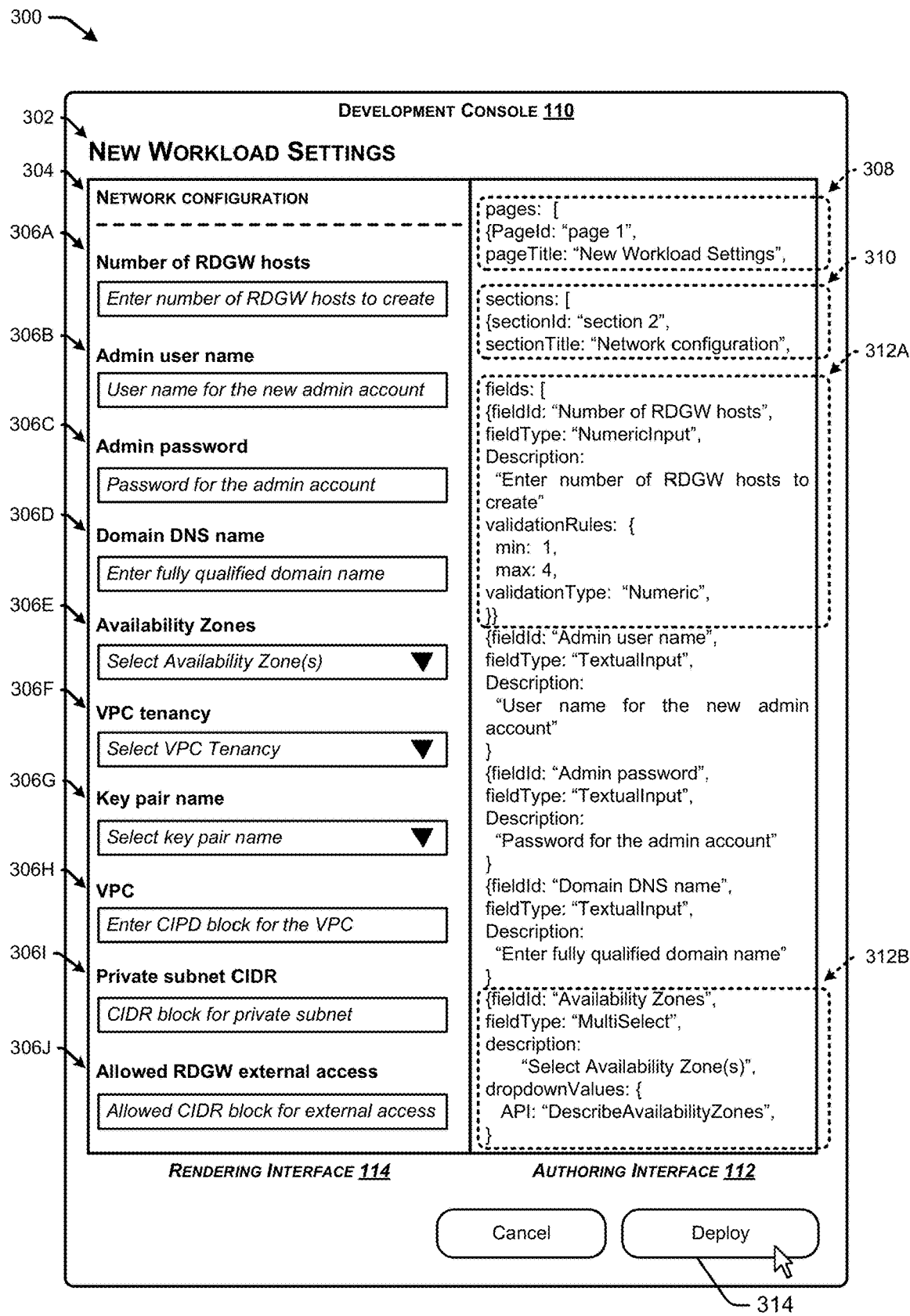
FIG. 3 illustrates a user interface that receives, from a developer using launch wizard, metadata language that defines a provisioning form for launching new workload, and dynamically generates and presents the provisioning form to the developer.

FIG. 3 illustrates a user interface (UI) 300 that receives, from a developer, metadata language that defines a provisioning form for launching new workload, and dynamically generates and presents the provisioning form to the developer.

As shown, the UI 300 illustrates examples of the authoring interface 112 and the rendering interface 114. The authoring interface 112 has a page title called "New Workload Settings" that is defined in the authoring interface 112 at portion 308. Further, the authoring interface 112 includes a section title called "Network configuration" that is defined in the authoring interface 112 at portion 310.

Further, the UI 300 includes a plurality of fields 306A-306J in the rendering interface 114 the developer 106 has created for the which a user 108 inputs provisioning parameters for the workload. As shown in the authoring interface 112, portion 312A was used to define field 306A and has validations rules defining a maximum and minimum for the numeric field, such as minimum of 1 and a maximum of 4 remote desktop gateway hosts to create for the workload. Further, portion 312B of the authoring interface 112 was used to define field 306E which is a field in which users 108 are prompted to list availability zones for a workload. As shown in portion 312B, the field has an instruction to call an API that collects a list of availability zones registered for that user's 108 account. The dropdown menus for that field 306E may then be populated with a list of the user's availability zones from which the user 108 may select.

In some examples, the developer 106 may be able to provide "depends-on" fields that allow the developer 106 to create fields 306 that depend on other fields 306. For instance, a depends-on field may cause presentation of different fields 306 depending on the values or input that the developer 106 used when creating the depends-on field. For instance, the developer 106 may create a depends-on field may request that an end user 108 select an availability zone in which a new workload 126 is being launched. The depends-on field 306 may be configured to present different information based on which of the availability zones the end user 108 selects. As a specific example, different VPC 116 options may be presented based on which availability zone is selected, and the end user 108 may select a VPC 116 for the selected availability zone in which the new workload 124 is being launched.

Once the developer 106 has finished defining the new workload using the authoring interface 112, the developer 106 may select the deploy option 314 to have the launch wizard 104 create the new workload.

Figure 4:
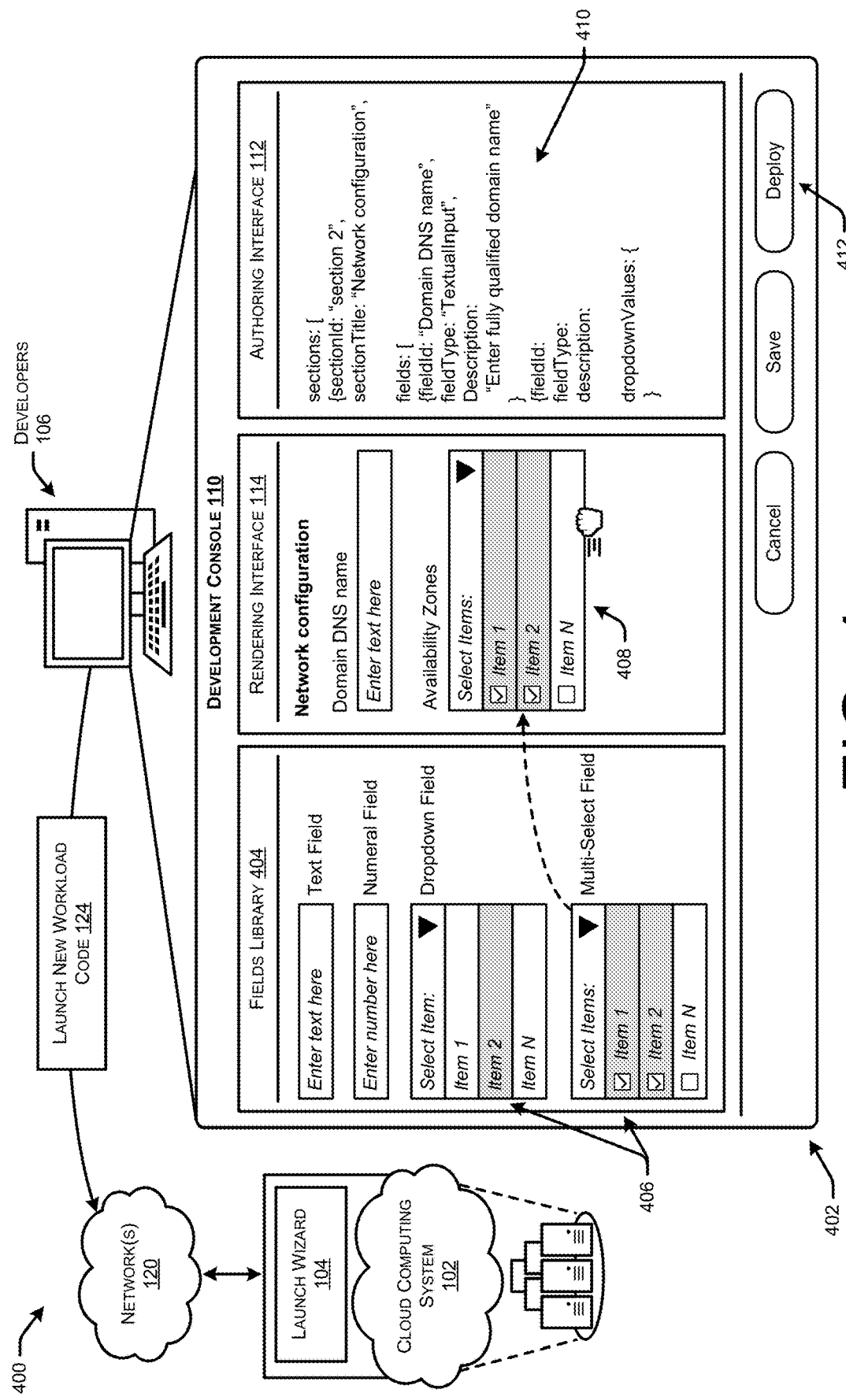
FIG. 4 illustrates a user interface through which a developer of a launch wizard uses a drop-and-drag library to input fields, or other components, to define a provisioning form for a new workload.

FIG. 4 illustrates a user interface 402 through which a developer 106 of a launch wizard 104 uses a drop-and-drag library to input fields, or other components, to define a provisioning form for a new workload.

As shown, the UI 402 includes a fields library 404 from which the developer 106 may select a type of field they would like to use in their provisioning form. Rather than having to manually input text in the metadata language, the developer 106 may simply drag-and-drop 408 a desired field from the fields library 404 and into the rendering interface 114. In some instances, by dragging-and-dropping a desired field into the rendering interface 114, the development console 110 may auto-populate the authoring interface 112 with the corresponding metadata language describing that field and allow the developer 106 to populate the authoring interface 112 with the information for the drop-and-dragged field.

Figure 5:
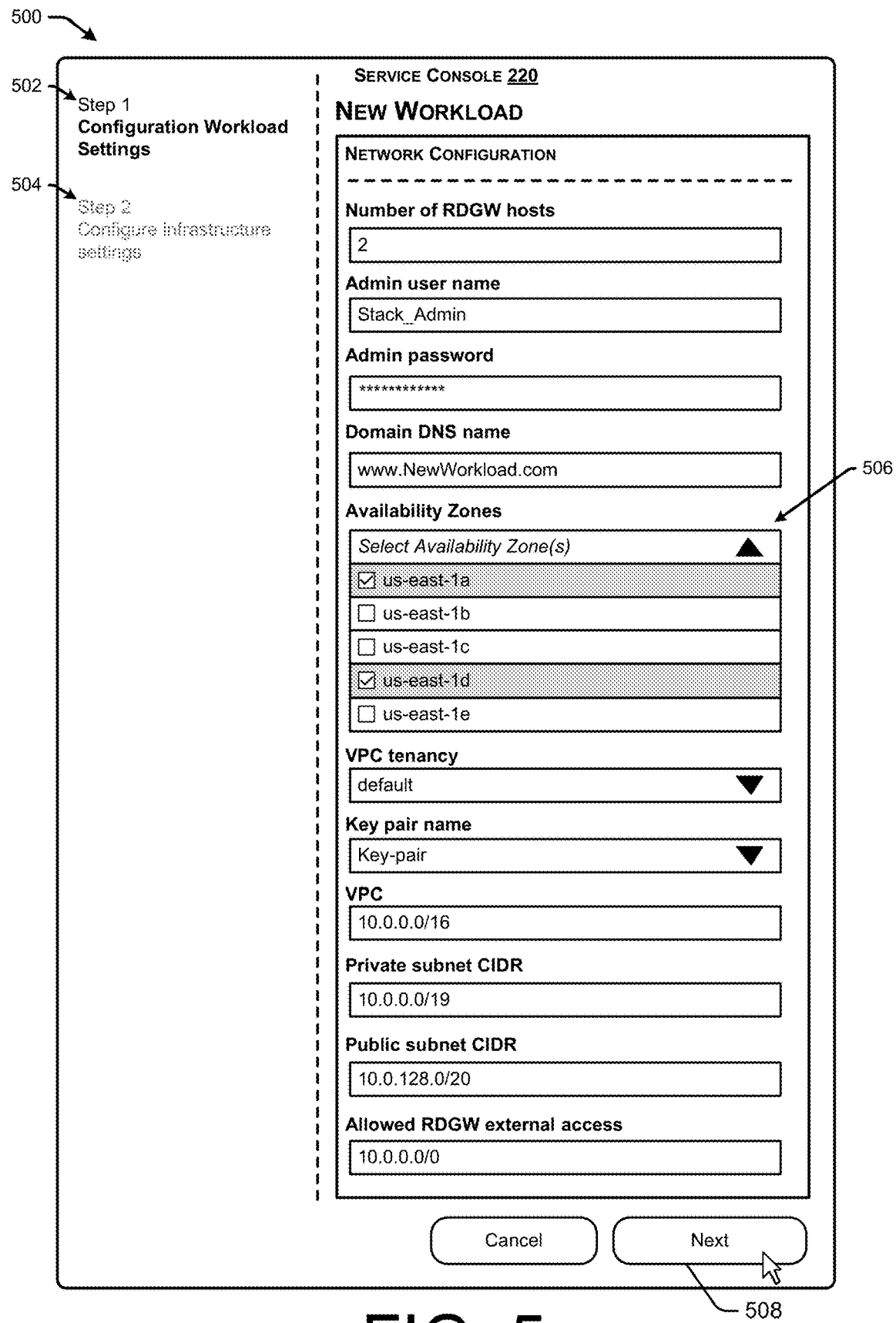
FIG. 5 illustrates a user interface through which an end user is guided by the launch wizard using a provisioning form to launch the new workload type.

FIG. 5 illustrates a user interface 500 through which an end user 108 of a launch wizard 104 is guided by the launch wizard 104 using a provisioning form to launch the new workload type.

Figure 6:
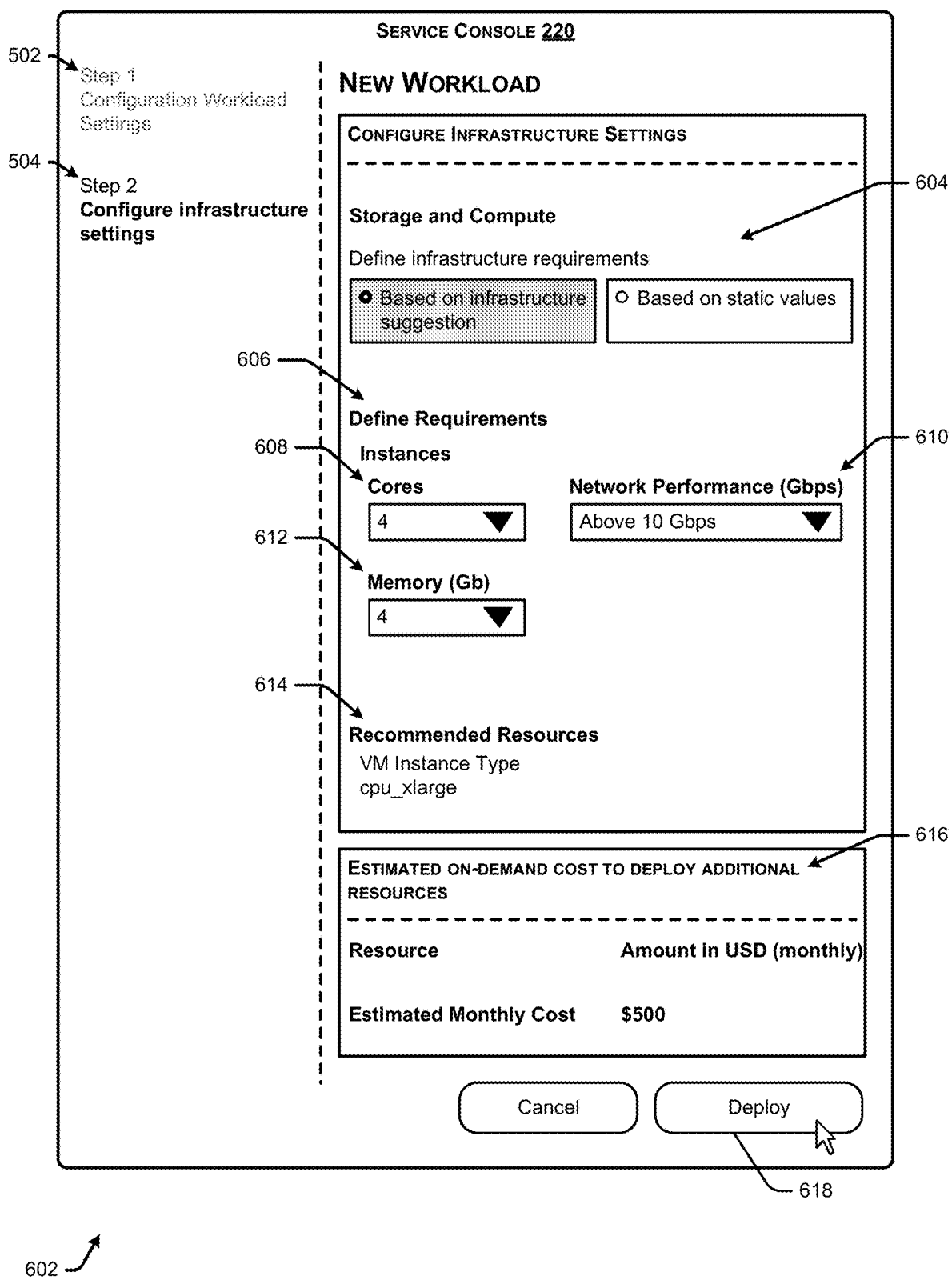
FIG. 6 illustrates a user interface through which an end user of a launch wizard defines infrastructure settings for a new workload type being launched.

As shown, the UI 500 includes a first step 502 where a user 108 provides configuration workload settings (illustrated in FIG. 5), and a second step 504 where a user 108 configures infrastructure settings (illustrated in FIG. 6). The service console 220 presenting the UI 500 includes multiple fields 506 that the user 108 populates with provisioning parameters, and selects a next option 508 to proceed to the second step 504.

FIG. 6 illustrates a user interface 602 through which an end user 108 of a launch wizard 104 defines infrastructure settings for a new workload type being launched.

As shown, the UI 602 has options for defining infrastructure requirements 604 where the end user 108 may either select an option to have the launch service 104 provide and use an infrastructure suggestion, or an option for the user 108 to define their own static values. The GUI 602 further illustrates the requirements 606, such as the number of cores 608 in the underlying instances, the network performance 610 of the underling instances (e.g., VM instances), and/or the amount of memory 612 allocated to the underlying instances. Further, the UI 602 includes a recommended resources 614 indication of a VM instance that is suitable and/or optimized based on the requirements of the workload.

Additionally, the UI 602 may include a widget or portion that indicates an estimate of on-demand cost for the end user 108 to deploy the additional resources they are defining in the UI 600. The widget may illustrate cost based on various time periods (e.g., daily, monthly, yearly, etc.). In this way, the end user 108 may determine whether or not they would like to pay the cost associated with launching the additional resources. The user 108 may select a deploy option 618 to cause the launch wizard 104 to deploy the workload.

FIGS. 7A, 7B, 8, and 9 illustrate flow diagrams of example methods 700, 800, and 900 that illustrate aspects of the functions performed at least partly by the cloud computing system 102 as described in this disclosure. The logical operations described herein with respect to FIGS. 7A, 7B, 8, and 9 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 7A, 7B, 8, and 9 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 7A:
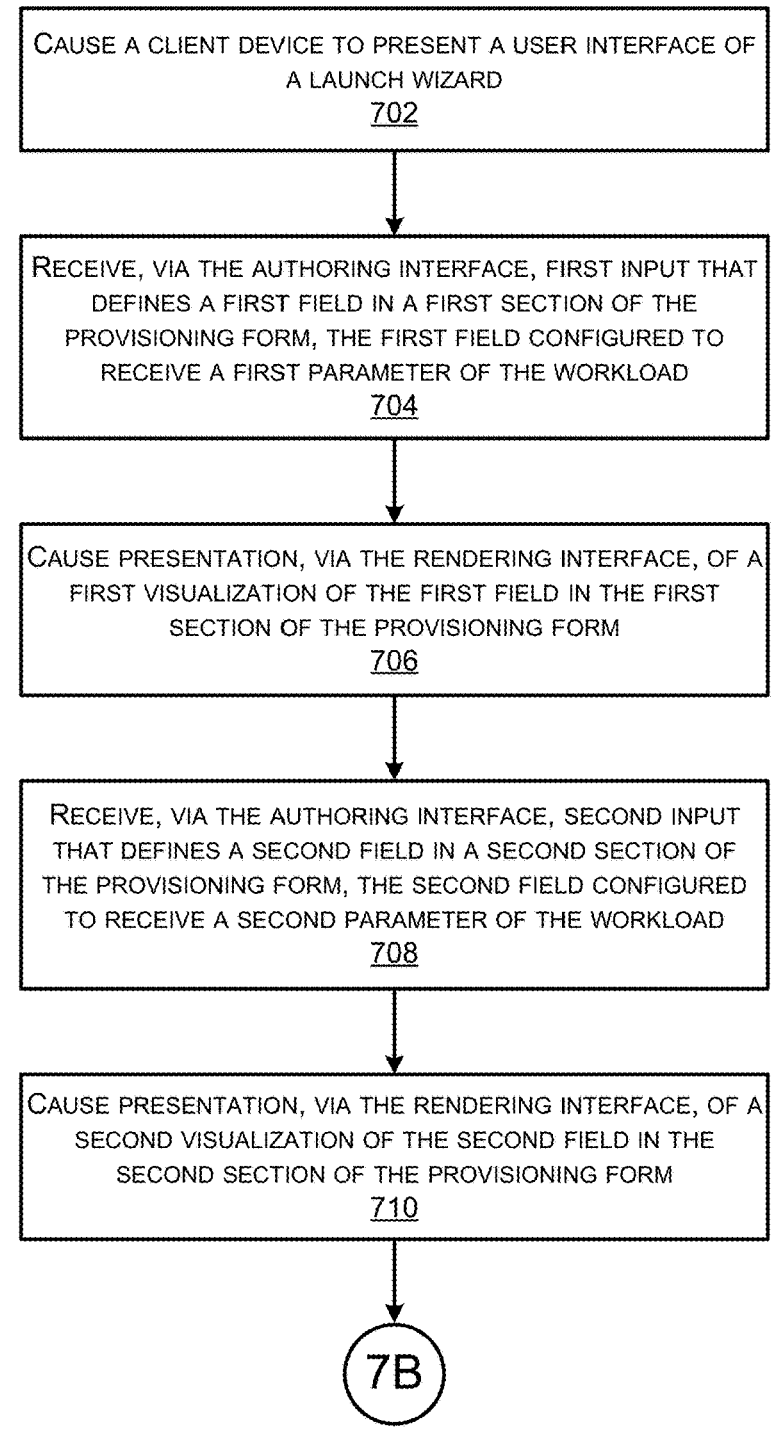
FIGS. 7A and 7B collectively illustrate a flow diagram of an example method for a launch wizard to provide an authoring interface and rendering interface to a developer to define a new workload, and receive a provisioning form usable to launch the workload using the launch wizard.
Figure 7B:
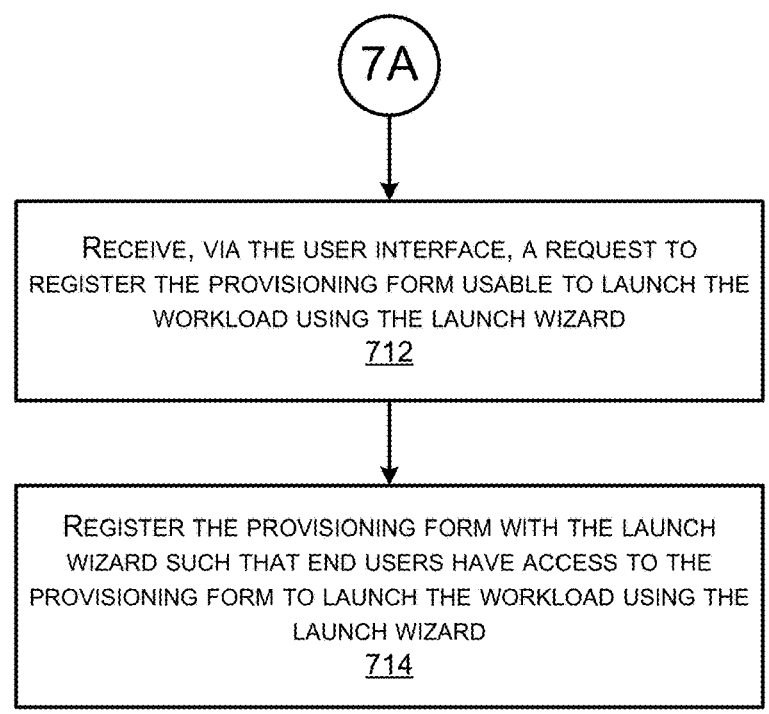

FIGS. 7A and 7B collectively illustrate a flow diagram of an example method for a container-management service to manage containers on a cluster, a primary capacity provider to initially manage computing infrastructure supporting the cluster, and a fallback capacity provider to service a capacity request in response to the primary capacity provider experiencing a failure.

FIGS. 7A and 7B collectively illustrate a flow diagram of an example method 700 for a launch wizard 104 to provide an authoring interface 112 and rendering interface 114 to a developer 106 to define a new workload 122, and receive a provisioning form usable to launch the workload 126 using the launch wizard 104.

At 702, the launch wizard 104 may cause a client device to present a user interface of the launch wizard. For instance, a development console 110 may be presented via a client 206 on a developer device. The user interface may have an authoring interface 112 that receives, in a metadata language, a definition of a provisioning form usable to create a workload for the cloud computing system 102, and a rendering interface 114 that dynamically presents visualizations of the provisioning form.

At 704, the launch wizard 104 may receive, via the authoring interface 112, first input that defines a first field 306 in a first section of the provisioning form where the first field 306 is configured to receive a first parameter of the workload. At 706, the launch wizard may cause presentation, via the rendering interface 114, of a first visualization of the first field in the first section of the provisioning form. This first visualization (e.g., user interface element(s)) may resemble the provisioning form as an end user 108 will see it, and the first visualization may be presented dynamically in response to receiving the first input that defines the first field 306.

At 708, the launch wizard may receive, via the authoring interface 112, second input that defines a second field 306 in a second section of the provisioning form where the second field is configured to receive a second parameter of the workload. At 706, the launch wizard may cause presentation, via the rendering interface 114, of a second visualization of the second field in the second section of the provisioning form. This second visualization (e.g., user interface element(s)) may resemble the provisioning form as an end user 108 will see it, and the second visualization may be presented dynamically in response to receiving the second input that defines the second field 306.

In some instances, the method 700 may further include at least partly responsive to receiving the first input, compiling the first input from the metadata language into first executable code corresponding to the first visualization, and at least partly responsive to receiving the second input, compiling the second input from the metadata language into second executable code corresponding to the second visualization.

At 710, the launch wizard 104 may receive, via the user interface, a request to register 312 (or deploy) the provisioning form usable to launch the workload 126 using the launch wizard 104. For instance, the developer may select the deploy option 314.

At 712, the launch wizard may register the provisioning form with the launch wizard 104 such that end users 108 have access to the provisioning form to launch the workload 126 using the launch wizard 104. For instance, the provisioning form may be registered with other registered workloads 216.

In some instances, the provisioning form may be used and the method 700 may include providing, via a console 220 of the launch wizard 104, an end user 108 with access to the provisioning form to create the workload 126, receiving, from the end user 108, provisioning information including at least the first and second parameters via the provisioning form, and using the provisioning information, provisioning the workload 126 in a virtual private cloud (VPC) 116 associated with the end user 108.

Figure 8:
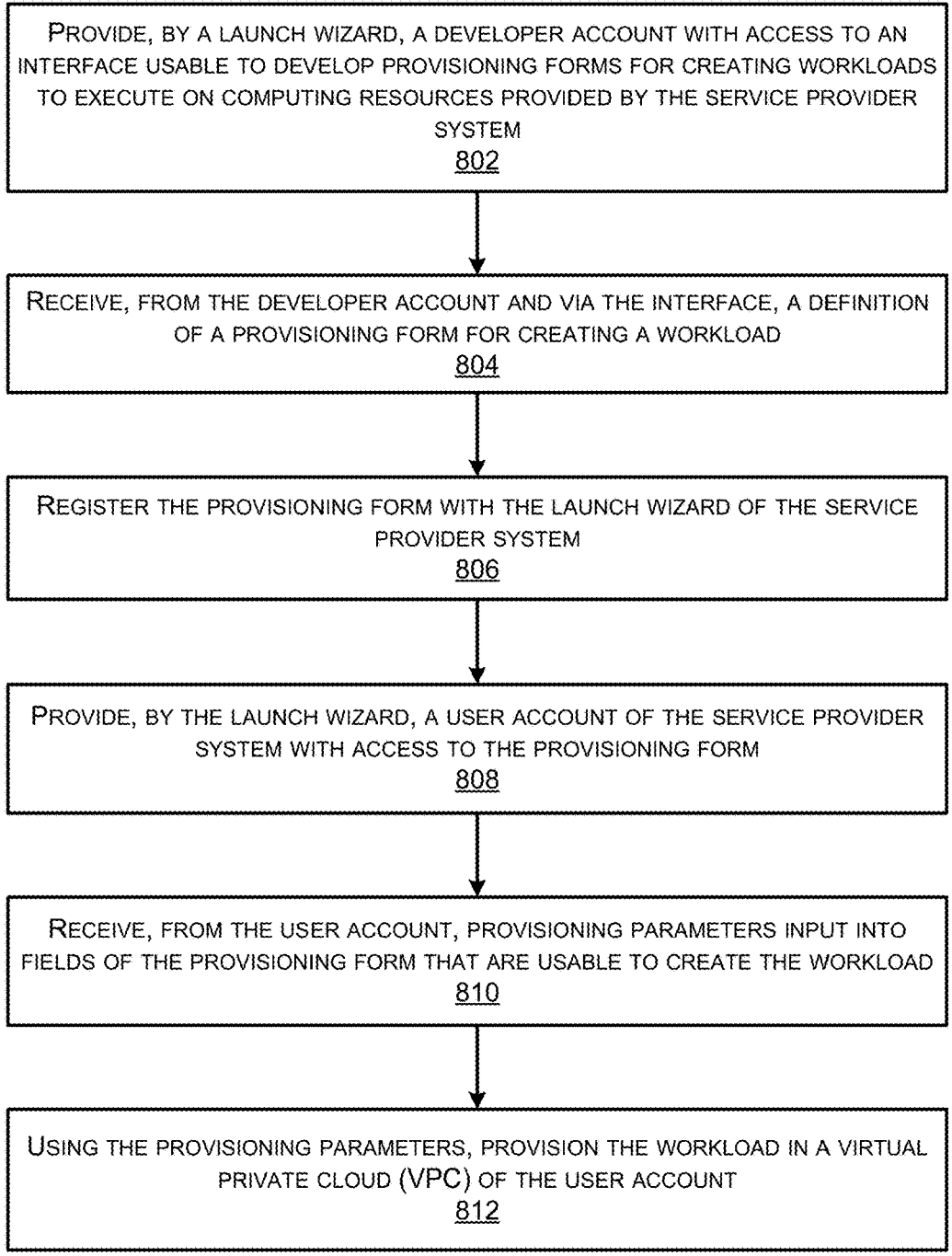
FIG. 8 illustrates a flow diagram of an example method for a launch wizard to receive a provisioning form from a developer that is usable to launch a new workload, and provide the provisioning form to an end user to use for launching the new workload.

FIG. 8 illustrates a flow diagram of an example method 800 for a launch wizard 104 to receive a provisioning form from a developer 106 that is usable to launch a new workload 126, and provide the provisioning form to an end user 108 to use for launching the new workload 126.

At 802, a launch wizard 104 may provide a developer account with access to an interface usable to develop provisioning forms for creating workloads to execute on computing resources provided by the service provider system (e.g., cloud computing system 102). For instance, the developer account 106 may have a device running a development console 110 that has an authoring interface to create a provisioning form for a new workload.

At 804, the launch wizard may receive, from the developer account and via the interface, a definition of a provisioning form for creating a workload. For instance, the developer account 106 may provide the definition of the provisioning form in a metadata language via an authoring interface 112.

At 806, the launch wizard may register the provisioning form with the launch wizard of the service provider system. For instance, the provisioning form may be registered with other registered workloads 216 such that end users 108 can use the provisioning form to launch new workloads.

At 808, the launch wizard 104 may provide a user account of the service provider system with access to the provisioning form. For example, an end user 108 may use a service console 220 to access the provisioning form and input provisioning parameters into the fields 306 to define the new workload.

At 810, the launch wizard 104 may receive, from the user account 108, provisioning parameters input into fields 306 of the provisioning form that are usable to create the workload. At 812, the launch wizard may, using the provisioning parameters, provision the workload 126 in a virtual private cloud (VPC) 116 of the user account 108.

Figure 9:
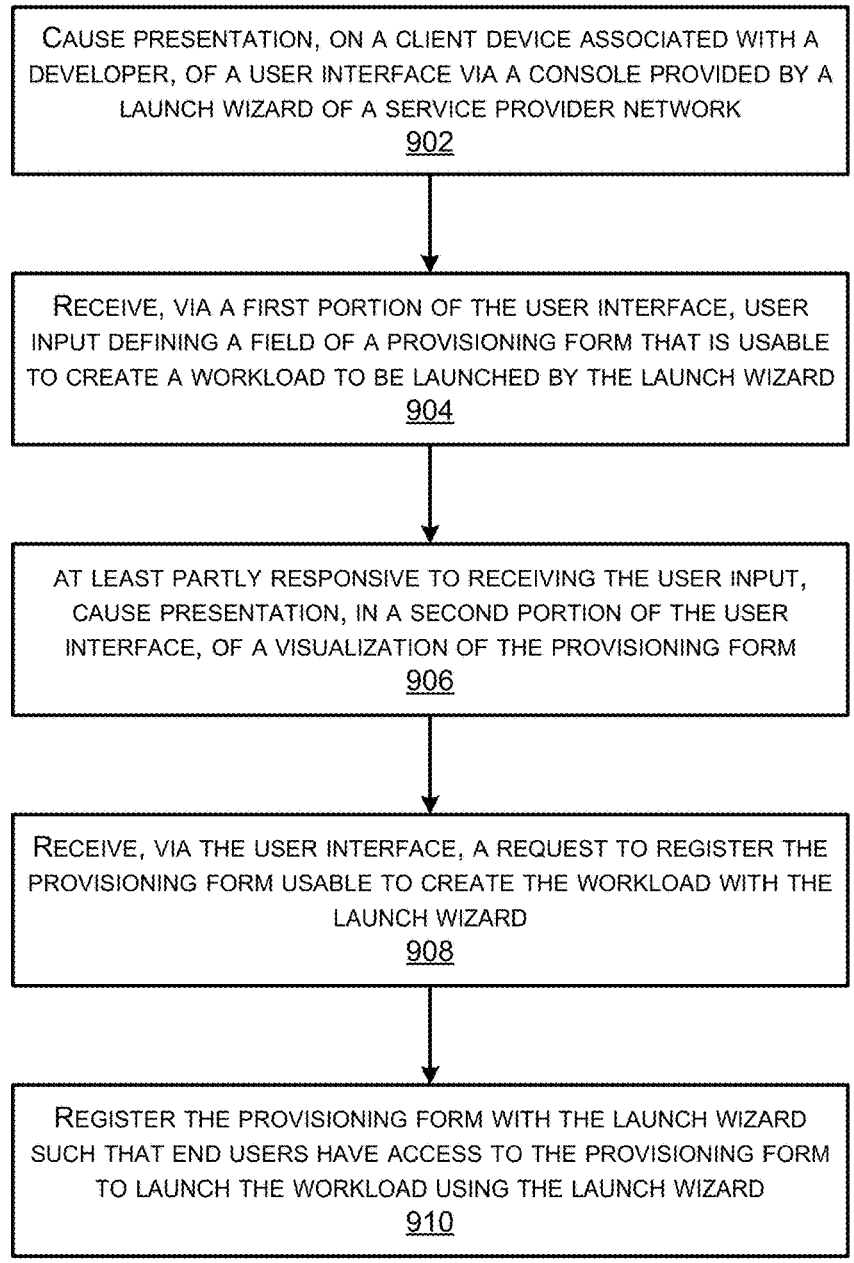
FIG. 9 illustrates a flow diagram of an example method for a launch wizard to provide a user interface through which a developer creates a provisioning form for a workload, and register the provisioning form with the launch wizard.

FIG. 9 illustrates a flow diagram of an example method 900 for a launch wizard to provide a user interface through which a developer creates a provisioning form for a workload, and register the provisioning form with the launch wizard.

At 902, a launch wizard 1004 may cause presentation, on a client device associated with a developer 106, of a user interface via a console provided by a launch wizard of a service provider network. For instance, the developer account 106 may have a device running a development console 110 that has an authoring interface to create a provisioning form for a new workload.

At 904, the launch wizard 104 may receive, via a first portion of the user interface, user input defining a field 306 of a provisioning form that is usable to create a workload 126 to be launched by the launch wizard 104. For instance, the developer account 106 may provide the definition of the provisioning form in a metadata language via an authoring interface 112.

At 906, the launch wizard may, at least partly responsive to receiving the user input, cause presentation, in a second portion of the user interface, of a visualization of the provisioning form. This visualization (e.g., user interface element(s)) may resemble the provisioning form as an end user 108 will see it, and the visualization may be presented dynamically in response to receiving the user input that defines the field 306.

At 906, the launch wizard may receive, via the user interface, a request to register the provisioning form usable to create the workload with the launch wizard. For instance, the provisioning form may be registered with other registered workloads 216 such that end users 108 have access to the provisioning form to launch the workload 126 using the launch wizard 104. At 908, the launch wizard may register the provisioning form with the registered workloads 216 such that end users 108 have access to the provisioning form to launch the workload 126 using the launch wizard 104.

Figure 10:
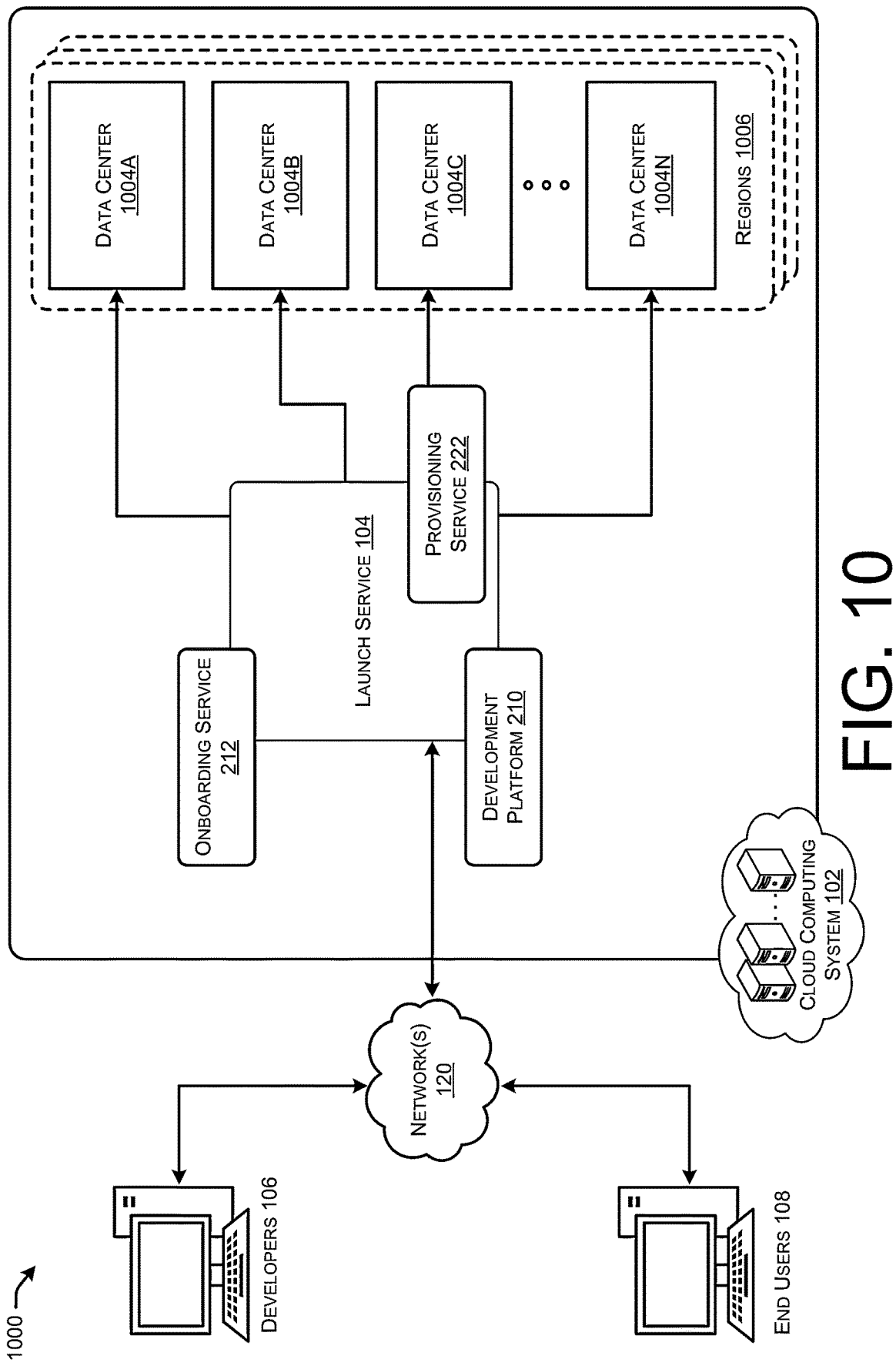
FIG. 10 is a system and network diagram that shows an illustrative operating environment that includes data centers of a cloud provider network that can be configured to implement aspects of the functionality described herein.

FIG. 10 is a system and network diagram 1000 that shows an illustrative operating environment that includes data centers 1004 in one or more regions 1006 of a cloud computing system 102 that can be configured to implement aspects of the functionality described herein. The cloud computing system 102 can provide computing resources, like VM instances and storage, on a permanent or an as-needed basis. Among other types of functionality, the computing resources provided by the cloud computing system 102 may be utilized to implement the various services described above. As also discussed above, the computing resources provided by the cloud computing system 102 can include various types of computing resources, such as data processing resources like VM instances, data storage resources, networking resources, data communication resources, network services, and the like.

Each type of computing resource provided by the cloud computing system 102 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, some or all of the network services described above, and/or other types of programs. Data storage resources can include file storage devices, block storage devices, and the like. The cloud computing system 102 can also be configured to provide other types of computing resources not mentioned specifically herein.

The computing resources provided by the cloud computing system 102 may be enabled in one embodiment by one or more data centers 1004A-1004N (which might be referred to herein singularly as "a data center 1004" or in the plural as "the data centers 1004"). The data centers 1004 are facilities utilized to house and operate computer systems and associated components. The data centers 1004 typically include redundant and backup power, communications, cooling, and security systems. The data centers 1004 can also be located in geographically disparate locations, or regions 1008. One illustrative embodiment for a data center 1004 that can be utilized to implement the technologies disclosed herein will be described below with regard to FIG. 11.

The users 108, such as administrators, of the user devices that utilize the cloud computing system 102 may access the computing resources provided by the cloud computing system 102 over any wired and/or wireless network(s) 120, which can be a wide area communication network ("WAN"), such as the Internet, an intranet or an Internet service provider ("ISP") network or a combination of such networks. For example, and without limitation, a user device operated by a user 108 of the cloud computing system 102 may be utilized to access the cloud computing system 102 by way of the network(s) 120. It should be appreciated that a local-area network ("LAN"), the Internet, or any other networking topology known in the art that connects the data centers 1004 to remote clients and other users can be utilized. It should also be appreciated that combinations of such networks can also be utilized.

Figure 11:
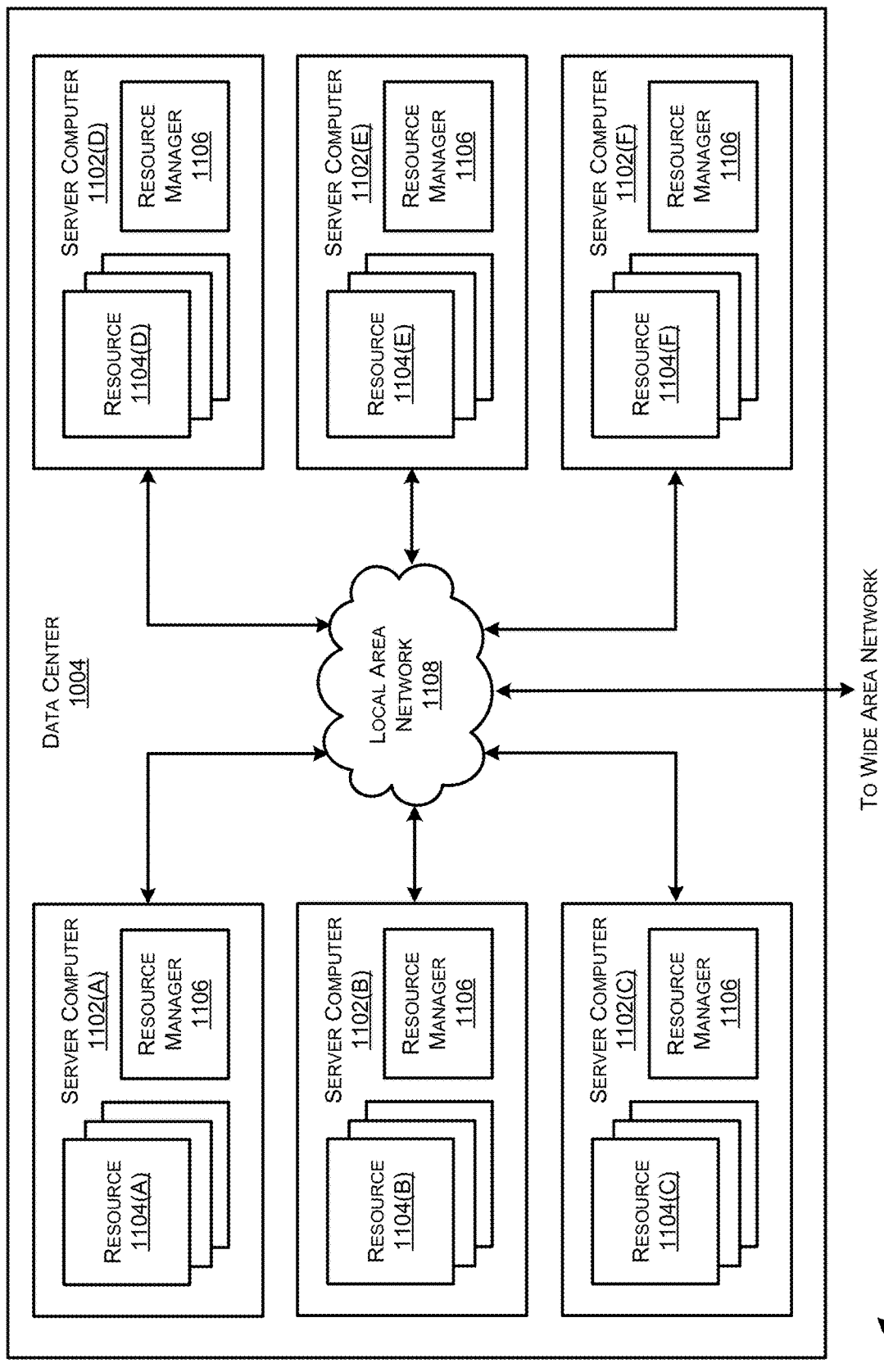
FIG. 11 is a computing system diagram illustrating a configuration for a data center that can be utilized to implement aspects of the technologies disclosed herein.

FIG. 11 is a computing system diagram 1100 that illustrates one configuration for a data center 1004 that implements aspects of the technologies disclosed herein. The example data center 1004 shown in FIG. 11 includes several server computers 1102A-1102F (which might be referred to herein singularly as "a server computer 1102" or in the plural as "the server computers 1102") for providing computing resources 1104A-1104E. In some examples, the resources 1104 and/or server computers 1102 may include, be included in, or correspond to, the computing devices described herein.

The server computers 1102 can be standard tower, rack-mount, or blade server computers configured appropriately for providing the computing resources described herein (illustrated in FIG. 11 as the computing resources 1104A-1104E). As mentioned above, the computing resources provided by the cloud computing system 102 can be data processing resources such as VM instances or hardware computing systems, database clusters, computing clusters, storage clusters, data storage resources, database resources, networking resources, and others. Some of the servers 1102 can also be configured to execute a resource manager 1106 capable of instantiating and/or managing the computing resources. In the case of VM instances, for example, the resource manager 1106 can be a hypervisor or another type of program configured to enable the execution of multiple VM instances on a single server computer 1102. Server computers 1102 in the data center 1004 can also be configured to provide network services and other types of services.

In the example data center 1004 shown in FIG. 11, an appropriate LAN 1108 is also utilized to interconnect the server computers 1102A-1102F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1104A-1104N, between each of the server computers 1102A-1102F in each data center 1004, and, potentially, between computing resources in each of the server computers 1102. It should be appreciated that the configuration of the data center 1004 described with reference to FIG. 11 is merely illustrative and that other implementations can be utilized.

Figure 12:
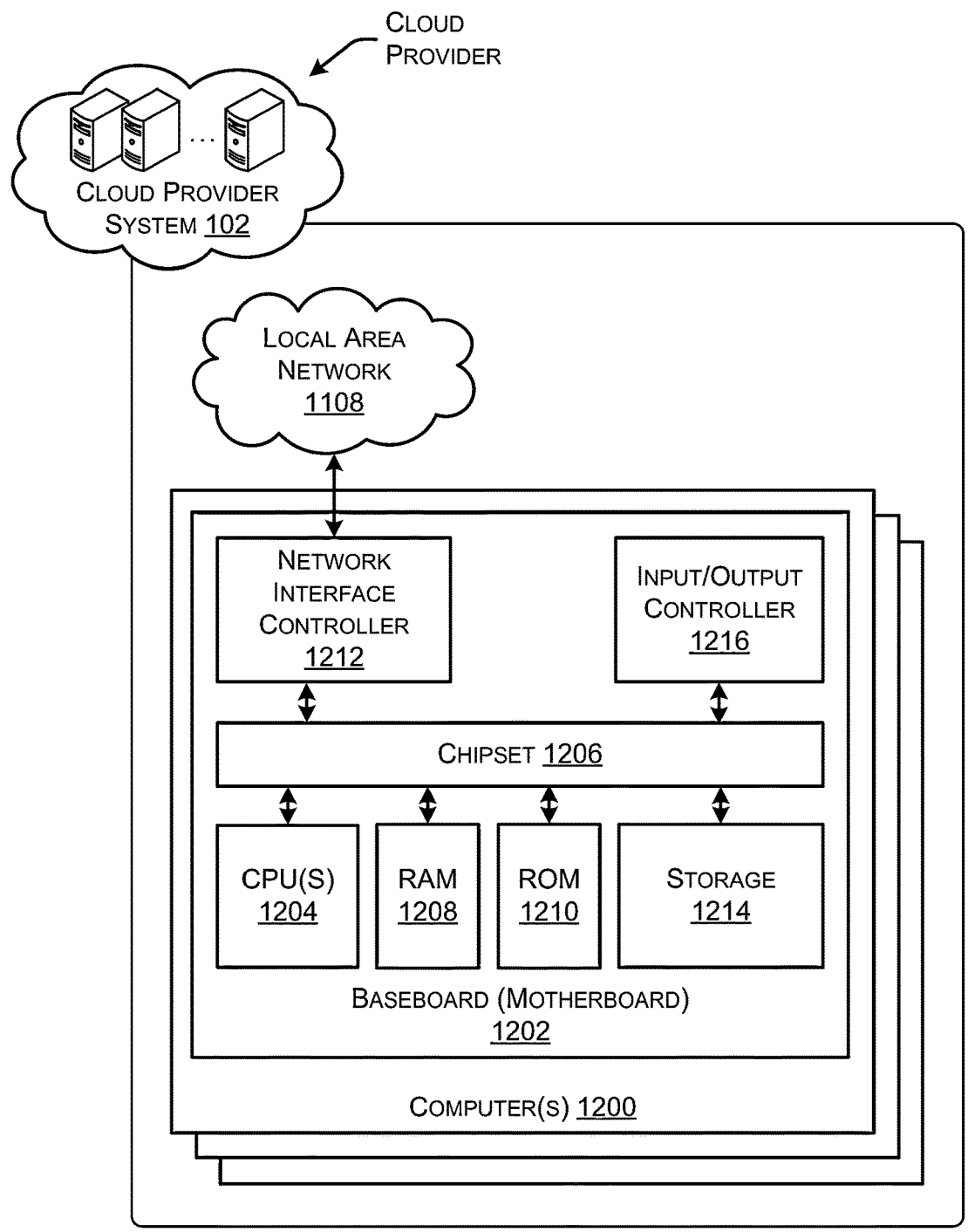
FIG. 12 is a computer architecture diagram showing an illustrative computer hardware architecture for implementing a computing device that can be utilized to implement aspects of the various technologies presented herein.

FIG. 12 shows an example computer architecture for a computer 1200 capable of executing program components for implementing the functionality described above. The computer architecture shown in FIG. 12 illustrates a conventional server computer, workstation, desktop computer, laptop, tablet, network appliance, e-reader, smartphone, or other computing device, and can be utilized to execute any of the software components or services presented herein. That is, all of the components or services may be supported by or run on one or more computers 1200.

The computer 1200 includes a baseboard 1202, or "motherboard," which is a printed circuit board to which a multitude of components or devices can be connected by way of a system bus or other electrical communication paths. In one illustrative configuration, one or more central processing units ("CPUs") 1204 operate in conjunction with a chipset 1206. The CPUs 1204 can be standard programmable processors that perform arithmetic and logical operations necessary for the operation of the computer 1200.

The CPUs 1204 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1206 provides an interface between the CPUs 1204 and the remainder of the components and devices on the baseboard 1202. The chipset 1206 can provide an interface to a RAM 1208, used as the main memory in the computer 1200. The chipset 1206 can further provide an interface to a computer-readable storage medium such as a read-only memory ("ROM") 1210 or non-volatile RAM ("NVRAM") for storing basic routines that help to startup the computer 1200 and to transfer information between the various components and devices. The ROM 1210 or NVRAM can also store other software components necessary for the operation of the computer 1200 in accordance with the configurations described herein.

The computer 1200 can operate in a networked environment using logical connections to remote computing devices and computer systems through a network, such as the network 1108. The chipset 1206 can include functionality for providing network connectivity through a network interface controller (NIC) 1212, such as a gigabit Ethernet adapter. The NIC 1212 is capable of connecting the computer 1200 to other computing devices over the network 1108 (or 104). It should be appreciated that multiple NICs 1212 can be present in the computer 1200, connecting the computer to other types of networks and remote computer systems.

The computer 1200 can include storage 1214 (e.g., disk) that provides non-volatile storage for the computer. The storage 1214 can consist of one or more physical storage units. The storage 1214 can store information by altering the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1200 can further read information from the storage 1214 by detecting the physical states or characteristics of one or more particular locations within the physical storage units.

In addition to the storage 1214 described above, the computer 1200 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1200. In some examples, the operations performed by the cloud computing system 102, and or any components included therein, may be supported by one or more devices similar to computer 1200. Stated otherwise, some or all of the operations performed by the cloud computing system 102, and or any components included therein, may be performed by one or more computer devices 1200 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The storage 1214 can store an operating system utilized to control the operation of the computer 1200. According to one embodiment, the operating system comprises the LINUX operating system. According to another embodiment, the operating system comprises the WINDOWS SERVER operating system from MICROSOFT Corporation of Redmond, Washington. According to further embodiments, the operating system can comprise the UNIX operating system or one of its variants. It should be appreciated that other operating systems can also be utilized. The storage 1214 can store other system or application programs and data utilized by the computer 1200.

In one embodiment, the storage 1214, RAM 1208, ROM 1210, and/or other computer-readable storage media may be encoded with computer-executable instructions which, when loaded into the computer 1200, transform the computer from a general-purpose computing system into a special-purpose computer capable of implementing the embodiments described herein. These computer-executable instructions transform the computer 1200 by specifying how the CPUs 1204 transition between states, as described above. According to one embodiment, the computer 1200 has access to computer-readable storage media storing computer-executable instructions which, when executed by the computer 1200, perform the various techniques described above. The computer 1200 can also include computer-readable storage media having instructions stored thereupon for performing any of the other computer-implemented operations described herein.

The computer 1200 can also include one or more input/output controllers 1216 for receiving and processing input from a number of input devices, such as a keyboard, a mouse, a touchpad, a touch screen, an electronic stylus, or other type of input device. Similarly, an input/output controller 1216 can provide output to a display, such as a computer monitor, a flat-panel display, a digital projector, a printer, or other type of output device. It will be appreciated that the computer 1200 might not include all of the components shown in FIG. 12, can include other components that are not explicitly shown in FIG. 12, or might utilize an architecture completely different than that shown in FIG. 12.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A computer-implemented method for a launch wizard of a cloud computing system to enable developers to develop provisioning forms for creating workloads, the computer-implemented method comprising:
   causing a client device to present a user interface of the launch wizard, the user interface having:
      an authoring interface that receives, in a metadata language, a definition of a provisioning form usable to create a workload for the cloud computing system;
      a rendering interface that dynamically presents visualizations of the provisioning form, wherein the visualizations of the provisioning form represent a user interface (UI) through which an end user of the launch wizard provides parameters to define the workload;
   receiving, via the authoring interface, first input that defines a first field in a first section of the provisioning form, the first field configured to receive a first parameter of the workload, the first parameter of the workload being an application parameter that is compiled into code of the workload;
   causing presentation, via the rendering interface, of a first visualization of the first field in the first section of the provisioning form;
   receiving, via the authoring interface, second input that defines a second field in a second section of the provisioning form, the second field configured to receive a second parameter of the workload, the second parameter of the workload being an infrastructure parameter that indicates underlying computing and storage infrastructure of the workload;
   causing presentation, via the rendering interface, of a second visualization of the second field in the second section of the provisioning form;
   receiving, via the user interface, a request to register the provisioning form usable to launch the workload using the launch wizard; and
   registering the provisioning form with the launch wizard such that end users have access to the provisioning form to launch the workload using the launch wizard.

2. The computer-implemented method of claim 1, further comprising:
   providing, via a console of the launch wizard, an end user with access to the provisioning form to create the workload;
   receiving, from the end user, provisioning information including at least the first and second parameters via the provisioning form; and
   using the provisioning information, provisioning the workload in a virtual private cloud (VPC) associated with the end user.

3. The computer-implemented method of claim 1, further comprising:
   at least partly responsive to receiving the first input, compiling the first input from the metadata language into first executable code corresponding to the first visualization; and at least partly responsive to receiving the second input, compiling the second input from the metadata language into second executable code corresponding to the second visualization.

4. The computer-implemented method of claim 1, further comprising, subsequent to registering the provisioning form:
receiving, from a developer account associated with the provisioning form, a request that the launch wizard make a modification to the provisioning form;
updating the provisioning form to generate an updated provisioning form to create the workload; and
providing the end users with access to the updated provisioning form.

5. A service provider system comprising:
one or more processors; and
one or more computer-readable media storing computer-executable instructions that, when executed by the one or more processors, cause the one or more processors to perform operations comprising:
providing, by a launch wizard, a developer account with access to an interface usable to develop provisioning forms for creating workloads to execute on computing resources provided by the service provider system;
receiving, from the developer account and via the interface, a definition of a provisioning form for creating a workload;
registering the provisioning form with the launch wizard of the service provider system;
providing, by the launch wizard, a user account of the service provider system with access to the provisioning form, the provisioning form including:
a first portion through which software parameters that define code of the workload are received; and
a second portion through which infrastructure parameters of the workload are received, the infrastructure parameters including at least a storage parameter and compute parameter for running the workload;
receiving, from the user account, provisioning parameters input into fields of the provisioning form that are usable to create the software parameters of the workload and infrastructure on which the workload executes; and
using the provisioning parameters, provisioning the workload in a virtual private cloud (VPC) of the user account.

6. The service provider system of claim 5, wherein providing the developer account with access to the interface includes:
providing an authoring portion of the interface that receives, in a metadata language, the definition of the provisioning form usable to create the workload; and
providing a rendering portion of the interface that dynamically presents visualizations of the provisioning form.

7. The service provider system of claim 5, the operations further comprising:
determining, using the provisioning parameters received via the fields of the provisioning form, application settings for an application supported by the workload;
receiving, via the provisioning form, infrastructure settings for an infrastructure on which the application executes; and
provisioning the workload on the infrastructure according to the infrastructure settings.

8. The service provider system of claim 5, the operations further comprising:
determining, using the provisioning parameters received via the fields of the provisioning form, application settings for an application supported by the workload;
determining infrastructure settings for an infrastructure suitable to run the workload;
providing the user account with a recommendation indicating the infrastructure settings for the infrastructure; and
provisioning the workload on the infrastructure according to the infrastructure settings.

9. The service provider system of claim 5, wherein the provisioning form is defined at least partly using a metadata language, the operations further comprising:
validating that the metadata language defining the provisioning form conforms to a schema used by the launch wizard to provision workloads.

10. The service provider system of claim 5, the operations further comprising:
receiving, from the developer account, a request that the launch wizard make a modification to the provisioning form;
updating the provisioning form to generate an updated provisioning form to create the workload; and
providing user accounts with access to the updated provisioning form.

11. The service provider system of claim 5, wherein the interface is accessible via a console of the launch wizard, the console being configured to:
receive, via the interface, first input in a metadata language defining a first provisioning parameter usable to create the workload;
at least partly responsive to receiving the first input, compile the first input from the metadata language into first executable code; and
using the first executable code, causing presentation of a first visualization via the interface.

12. The service provider system of claim 5, the operations further comprising:
mapping the provisioning form to a provisioning template that, when populated, is usable by the service provider system to provision the workload; and
populating the provisioning template with the provisioning parameters,
wherein the workload is provisioned in the VPC of the user account using the provisioning template.

13. The service provider system of claim 5, wherein:
the software parameters comprise at least one of:
a domain name associated with the workload;
an availability zone in which the workload is launched;
a virtual private cloud in which the workload is launched; or
a subnetwork in which the workload is launched; and
the infrastructure parameters comprise at least one of:
an amount of compute allocated for the workload;
an amount of storage allocated for the workload;
an amount of networking resource allocated for the workload; or
an amount of memory allocated for the workload.

14. A computer-implemented method comprising:
causing presentation, on a client device associated with a developer, of a user interface via a console provided by a launch wizard of a service provider network;
receiving, via a first portion of the user interface, user input defining a field of a provisioning form that is usable to create a workload to be launched by the launch wizard, the provisioning form including:
   a first field through which software parameters that define code of the workload are received; and
   a second field through which infrastructure parameters of the workload are received, the infrastructure parameters including at least a storage parameter and compute parameter for running the workload;
at least partly responsive to receiving the user input, causing presentation, in a second portion of the user interface, of a visualization of the provisioning form;
receiving, via the user interface, a request to register the provisioning form usable to create the workload with the launch wizard; and
registering the provisioning form with the launch wizard such that end users have access to the provisioning form to launch the workload using the launch wizard.

15. The computer-implemented method of claim 14, wherein:
   the first portion of the user interface receives user inputs defining fields of the provisioning form in a metadata language; and
   the second portion of the user interface dynamically presents visualizations of a current state of the provisioning form in response to receiving the user inputs.

16. The computer-implemented method of claim 14, further comprising:
   providing, by the launch wizard, a user account of the service provider network with access to the provisioning form;
   receiving, from the user account, provisioning parameters input into fields of the provisioning form that are usable to launch the workload; and
   using the provisioning parameters, provisioning the workload in a virtual private cloud (VPC) of the user account.

17. The computer-implemented method of claim 16, further comprising:
   determining, using the infrastructure parameters, infrastructure settings for an infrastructure suitable to run the workload;
   providing the user account with a recommendation indicating the infrastructure settings for the infrastructure; and
   provisioning the workload on the infrastructure according to the infrastructure settings.

18. The computer-implemented method of claim 14, further comprising:
   receiving second user input defining a validation rule according to which a provisioning parameter that is input into the field must comply;
   providing, by the launch wizard, a user account of the service provider network with access to the provisioning form via the console;
   receiving, from the user account, a particular provisioning parameter input into the field of the provisioning form;
   determining that the particular provisioning parameter violates the validation rule; and
   outputting an error indicating a violation of the validation rule to the user account via the console.

19. The computer-implemented method of claim 14, wherein the provisioning form is defined at least partly using a metadata language, further comprising:
   validating that the metadata language defining the provisioning form conforms to a schema used by the launch wizard to provision workloads.

20. The computer-implemented method of claim 14, further comprising:
   receiving a request that the launch wizard make a modification to the provisioning form;
   updating the provisioning form to generate an updated provisioning form to create the workload; and
   providing user accounts with access to the updated provisioning form.

* * * * *